United States Patent [19]

Winters

[11] 4,103,042

[45] Jul. 25, 1978

[54] HOT FILAMENT, ARC TYPE ION SOURCE AND METHOD

[75] Inventor: Harold Franklin Winters, San Jose, Calif.

[73] Assignee: International Business Machines Corporation, Armonk, N.Y.

[21] Appl. No.: 773,464

[22] Filed: Mar. 2, 1977

Related U.S. Application Data

[63] Continuation of Ser. No. 631,986, Nov. 14, 1975, abandoned.

[51] Int. Cl.[2] ....................... B32B 35/00; C23C 11/10

[52] U.S. Cl. ...................................... 427/38; 427/111; 427/122; 427/140; 427/142; 204/298

[58] Field of Search ................. 427/111, 112, 140, 38, 427/122; 428/367; 313/345, 230, 359–363; 315/111.8; 250/426, 427; 204/298

[56] References Cited

U.S. PATENT DOCUMENTS

| | | | |
|---|---|---|---|
| 1,566,848 | 12/1925 | Fonda | 427/122 |
| 1,600,203 | 9/1926 | Campbell | 427/122 |
| 1,659,749 | 2/1928 | Skaupy | 427/111 |
| 1,664,136 | 3/1928 | Shaw | 427/122 |
| 2,367,331 | 1/1945 | Bondley | 427/111 |
| 3,107,180 | 10/1963 | Dieffendorf | 427/111 |

OTHER PUBLICATIONS

Schneider, *Thermionic Emission of Thoriated Tungsten,* J. of Chem. Physics, vol. 28, No. 4 (4–1958) pp. 675–682.

*Primary Examiner*—Michael F. Esposito
*Attorney, Agent, or Firm*—Joseph E. Kieninger

[57] ABSTRACT

A method and apparatus for providing an improved hot filament, arc type ion source is disclosed. The arc type ion source utilizes a filament having a carburized surface layer and/or means to provide a hydrocarbon gas containing atmosphere about said filament. The method includes providing an atmosphere containing a hydrocarbon gas about said filament so that the filament can be continuously carburized as part of the ion source.

6 Claims, 1 Drawing Figure

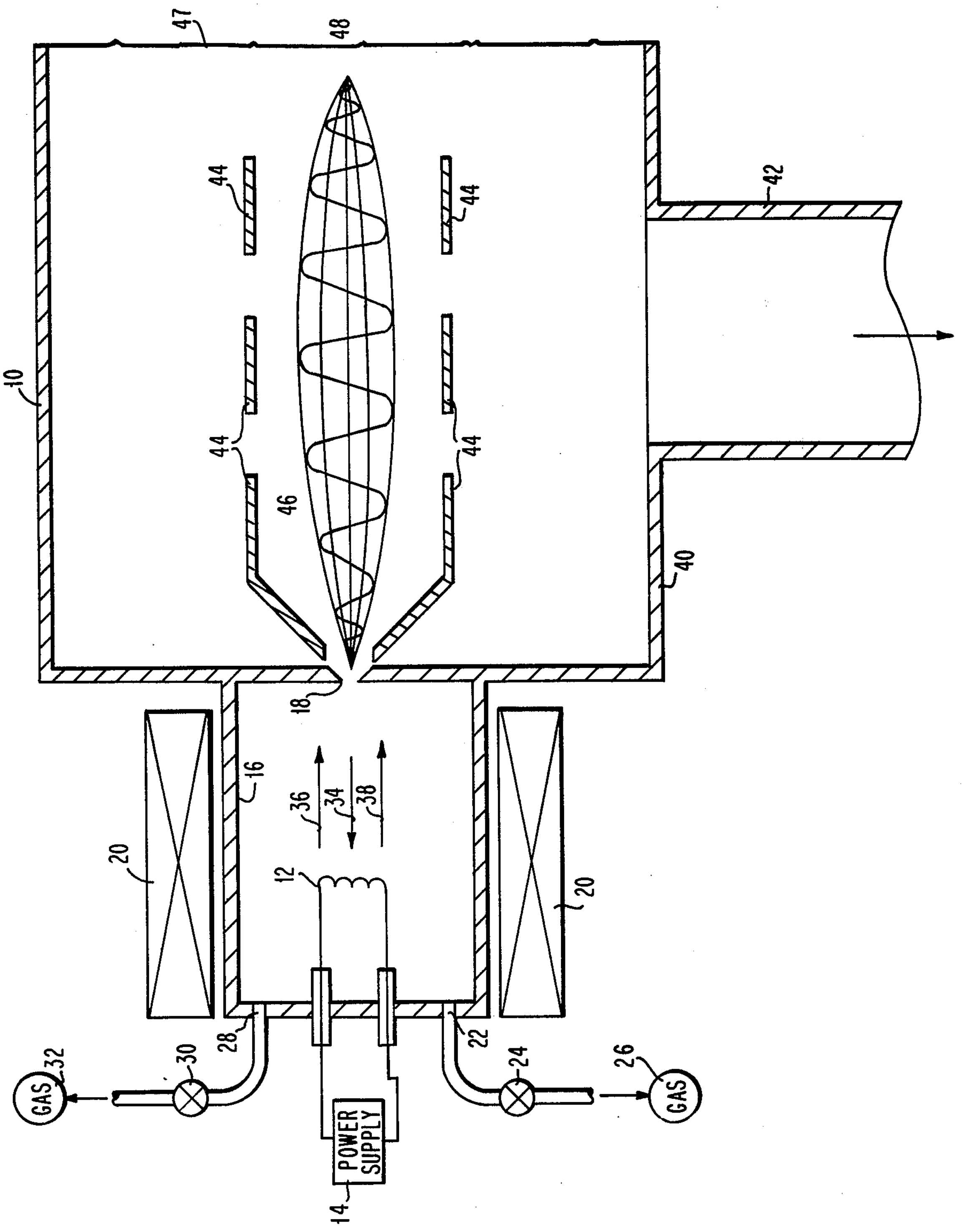
GAS
GAS
POWER SUPPLY
10
12
14
16
18
20
20
22
24
26
28
30
32
34
36
38
40
42
44
44
44
44
46
47
48

HOT FILAMENT, ARC TYPE ION SOURCE AND METHOD

CROSS-REFERENCE TO RELATED APPLICATIONS

The present application is a continuation of copending application Ser. No. 631,986, filed Nov. 14, 1975 now abandoned.

FIELD OF THE INVENTION

This invention relates to ion implantation and more particularly to apparatus and a method for providing an improved, arc type source having a filament with increased lifetime.

DESCRIPTION OF THE PRIOR ART

Ion implantation is used for a variety of applications including the production of semiconductor devices. Ion implantation accelerators utilize either a cold cathode or a hot cathode type ion source. Cold cathodes are generally not preferred since the parameters are not as easily controllable as are hot cathode filaments. Another disadvantage of cold cathode sources are that they do not put out as high an ion current and require higher voltage then does the hot cathode ion sources.

A hot cathode, arc type ion source is preferred in most applications. In this type of device the hot cathode, that is the filament, is sputtered by ions from the plasma. A flux of ions from the surrounding plasma continuously bombards the filament, i.e., the hot cathode, thereby causing the filament to be sputtered. During the sputtering the material from the filament is deposited on the surrounding walls. Sputtering reduces the amount of material contained in the filament until the filament does not have sufficient material to be operable. At this point the filament finally fails thereby limiting the usable lifetime of the source.

Presently, conventional hot cathode ion sources use pure elemental filaments, generally tungsten. The typical lifetime of a tungsten filament is 40–200 hours depending on the mass of the filament and various source characteristics. This relatively short lifetime is a disadvantage since in order to replace the filament, it is necessary to shut down the implantation accelerator which is under vacuum and open it to the atmosphere. After replacing the filament, the device is then pumped down to the appropriate pressure. It must then be operated for a period of time, for example, one to four hours, before the original characteristics of the source are obtained.

Tungsten filaments have been widely used in light bulbs for may years. Since tungsten is the primary metal for this type of filament, many experimental filaments have been made by modifying the composition in one way or another. For example, it has been determined that thoriated tungsten has improved properties as an electron emitter and as a result has been used commercially in some applications. Another example of an experimental modification is described in the Journal of Chemical Physics, Vol. 28, No. 4, April 1958, p. 675–682 wherein thoriated tungsten filaments which are uncarburized and carburized are referred to. It is not known whether these light bulb filaments have ever been used commercially in light bulbs or in any other filament application other than light bulbs.

SUMMARY OF THE INVENTION

It is a primary object of this invention to provide an improved hot cathode ion source for ion implantation purposes.

It is another object of this invention to provide hot cathode ion source having a filament with increased lifetime.

It is yet another object of this invention to provide a method of increasing a lifetime of a filament in a hot cathode ion source.

These and other objects of this invention are accomplished by a device and/or by a method which provides a filament having a carburized surface layer. A preferred embodiment utilizes a thoriated tungsten filament having a carburized surface layer. Another embodiment employs means to provide a hydrocarbon gas atmosphere about the filament whereby the filament is carburized during the operation of the ion implantation source.

Other objects of this invention will be apparent from the following detailed description, reference being made to the drawings wherein a preferred embodiment of the present invention is clearly shown.

BRIEF DESCRIPTION OF THE DRAWING

The FIGURE shows a hot cathode, arc type ion source in accordance with this invention.

DESCRIPTION OF THE ILLUSTRATED EMBODIMENTS

As shown in the drawing, an improved hot filament, arc type ion source 10 contains a filament 12 connected to power means 14. The filament 12 is tungsten, tantalum, iridium, molybdenum or rhodium or some other appropriated high melting point material. In a preferred embodiment the filament is a thoriated tungsten filament containing 0.2 to 1.9% $ThO_2$. In accordance with this invention the filament 12 has a carburized surface layer thereon. In one embodiment of this invention the filament 12 has a carburized surface layer thereon as soon as it is installed. The filament may be carburized by any suitable method. For example, the filament when manufactured may be exposed to an atmosphere at an elevated temperature containing the hydrocarbon gas thereby forming a carburized surface layer thereon. The sputtering rate of a filament having a carburized surface thereon is less than that of a filament containing a pure elemental material. This reduced sputtering rate will increase the lifetime of the filament. The increased filament lifetime will reduce the down time of the arc type ion source, that is, the implantation accelerator.

Another embodiment of this invention involves the use of a filament 12 of a pure elemental material which is subsequently carburized during the operation of the ion source to form a carburized layer thereon and will also be hereinafter fully discussed.

As will be more fully discussed hereinafter, the filament 12 having a carburized surface layer thereon may, in accordance with still another embodiment of this invention, be carburized additionally during the operation of the ion source, thereby maintaining a certain carburized surface layer thickness.

The filament 12 is located in plasma chamber 16. The plasma chamber 16 has an opening therein 18 through which the ion beam passes. Surrounding the plasma chamber 16 is a solenoid 20 which creates the magnetic field. A gas inlet 22 is connected to a valve 24 for regulating the introduction of a gas source 26. The gas source 26 provides the source of the ions to be used such as arsine, phosphine and other gases of this type as is well known in the art. A second gas inlet 28 is connected to a valve 30 which regulates the introduction of the gas source 32. The gas source 32 is a gas containing carbon such as a light hydrocarbon gas, for example, methane, ethane, propane and the like. In a preferred embodiment a partial pressure of $10^{-6}$ to $10^{-5}$ Torr of a methane gas is introduced from source 32 through valve 30 through inlet 28 into the chamber 16 where it reacts with a tungsten filament to form a carburized surface layer thereon. The methane gas from source 32 may be admitted into the plasma chamber 16 periodically or it may be continuously passed into the chamber about the cylinder 12. This decomposition reaction allows the filament to be continuously carburized during the operation of the arc type ion source.

During operation in plasma chamber 16 gas from source 26, for example, arsine, is introduced into the chamber at a pressure of $10^{-3}$ to $10^{-1}$ Torr. The plasma contains arsine ions and electrons. The ions 34 bombard the filament 12 causing the filament to sputter and remove material therefrom and deposit it onto the walls of the chamber 16. Ions 36 and 38 are directed away from the filament towards the opening 18 through which the ions leave the chamber 6 into lens chamber 40. Lens chamber 40 is connected by an opening 42 to a diffusion or an evaporation pump to maintain a pressure of about $10^{-6}$ Torr. In the lens chamber 40 are a series of lens 44 which focus the ions into a beam 46 which is then used at the end of lens chamber 40 in the way desired, depending on the particular application to which the ion beam is to be used. The lens chamber 40 is shown as ending at 47 with the ion beam being focused at 48 for the application such as ion implantation and the like.

Although a preferred embodiment of this invention has been described, it is understood that numerous variations may be made in accordance with this invention.

What is claimed:

1. A method of extending the lifetime of a hot filament in an arc type ion source device of the type wherein said hot filament is exposed to ion bombardment during operation of said device comprising the steps of:

providing said hot filament with a carburized surface layer; and revitalizing said carburized layer by exposing said hot filament to a carbon containing gas while said hot filament is subjected to ion bombardment from said device.

2. The method as described in claim 1 whereby the step of revitalizing said layer is continuous.

3. The method as described in claim 1 whereby the step of revitalizing said layer is intermittent.

4. A method as described in claim 1 whereby said carbon-containing gas is a hydrocarbon in a gaseous form.

5. A method as described in claim 4 whereby said hydrocarbon is methane.

6. A method of extending the lifetime of a hot filament in an arc type ion source device of the type wherein said hot filament is exposed to ion bombardment during operation of said device comprising the steps of:

providing said hot filament with a carburized surface layer; and revitalizing said carburized layer by exposing said hot filament to a carbon containing gas.

* * * * *